United States Patent Office 2,843,766
Patented July 15, 1958

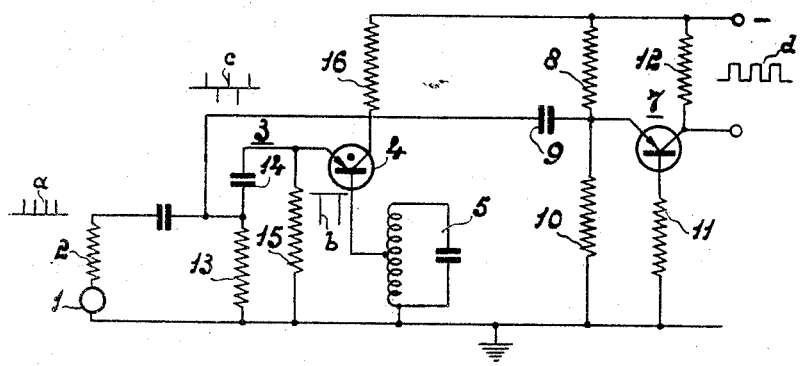
INVENTORS
GERARDUS ROSIER
HENDRIK VOLKERS

2,843,766
IMPULSE-CONVERTING CIRCUIT-ARRANGEMENT

Gerardus Rosier and Hendrik Volkers, Hilversum, Netherlands, assignors, by mesne assignments, to North American Philips Company, Inc., New York, N. Y., a corporation of Delaware Application November 19, 1954, Serial No. 470,063

Claims priority, application Netherlands November 20, 1953

4 Claims. (Cl. 307—88.5)

The present invention concerns impulse-converting circuit arrangements. More particularly, the invention relates to circuit-arrangements for converting a train of pulses of equal sign into a train of positive and negative impulses. Such circuit-arrangements, may, for example, be used in television for producing a square wave voltage of which the leading edge and the trailing edge alternately correspond to successive impulses of the first-mentioned train.

The invention has the feature that the first-mentioned pulse train is supplied to the input circuit of a transistor which is connected as a frequency divider and returns pulses of larger amplitude, but of opposite sign and with a frequency corresponding to a sub-harmonic of the pulse repetition frequency of the first-mentioned pulses, to the said input circuit, thus producing the desired pulse train in the said input circuit. It is based on the recognition that a transistor thus connected has a strong reaction on its input circuit, so that a circuit-arrangement of simple construction permits rectified pulses to be converted into, for example, alternating positive and negative pulses which, in turn, may be converted into a square-wave voltage by means of a trigger circuit.

In order that the invention may be readily carried into effect, it will now be described, by way of example, with reference to the accompanying drawing wherein the figure is a schematic diagram of an embodiment of the circuit arrangement of the present invention.

In the figure, the pulse train $a$ of equal positive pulses, generated by a pulse generator 1 with internal resistance 2 is supplied to the input circuit 3 of a transistor 4. The transistor 4 may comprise a point contact transistor, which is connected as a frequency divider and the base circuit of which comprises a parallel resonance circuit 5 tuned to a sub-harmonic of the pulse repetition frequency. The circuit 5, as is known, brings about positive feedback of the transistor, if desired to such a degree that the transistor is caused to self-oscillate with an oscillation corresponding to the resonance frequency of the circuit 5 and synchronized by the pulse train $a$.

By suitably proportioning the circuit-arrangement it is found that the transistor 4 returns pulses $b$ to its input circuit 3, of which pulses the frequency corresponds to the said subharmonic of the pulse repetition frequency and of which the amplitude exceeds that of the pulse train $a$. to this end the transistor 4 need not necessarily be caused to self-oscillate by the circuit 5, since it is sufficient for the circuit 4—5 to be unstable on the occurrence of the pulse $a$ concerned. The said pulses $b$ are oppositely directed to the pulses of the train $a$ and occur substantially isochronously with a number of these pulses, which results in a pulse train $c$ with positive and negative pulses in the circuit 3.

If the resonance frequency of the circuit 5 corresponds to half the pulse repetition frequency of the pulse train $a$, the pulses $c$, as shown in the figure, will alternately become positive and negative. The pulses $c$ are subsequently converted into a square-wave voltage $d$ by means of a transistor trigger-circuit 7 of known construction. If desired, the trigger circuit 7 may be self-oscillating and synchronized by the pulse train $c$.

If, contrary thereto, the resonance frequency of the circuit 5 corresponds to a lower sub-harmonic of the pulse repetition frequency of the train $a$, the pulse train $c$ will exhibit equal numbers of pulses of one sign (positive, in the present case) each time separated by one pulse of the other sign (negative, in the present case) so that the trigger-circuit 7 will produce a square-wave voltage with positive and negative phases of uneven duration.

In a practicable circuit-arrangement, the circuit elements may have the following values: pulse repetition frequency of train $a$=31,250 cycles per second; pulse repetition frequency of train $b$=15,625 cycles per second; transistors of type OC 51; circuit 5=4700 micromicrofarads and 22 millihenries having a tapping at 2/5 from the bottom; resistor 8=47 kilohms, capacitor 9=1000 micromicrofarads, resistor 10=4700 ohms; resistor 11= 5100 ohms; resistor 12=2200 ohms; resistor 13=680 ohms; capacitor 14=2200 micromicrofarads; resistor 15= 47 kilohms; and resistor 16=1 to 2 kilohms.

What is claimed is:

1. A circuit arrangement comprising a transistor having an emitter electrode, a base electrode forming with said emitter electrode an input electrode system and a collector electrode, means for producing a first pulse train of a series of pulses of equal sign and a given repetition frequency, means coupling said first pulse train producing means between one electrode of said input electrode system and a point at ground potential, a positive feedback circuit coupling the other electrode of said input electrode system with said one electrode, said positive feedback circuit comprising means for producing a second pulse train of a series of pulses with a repetition frequency which is a sub-harmonic of said given repetition frequency, said second pulse train producing means being connected to said other electrode, said pulses of said second pulse train having a substantially greater amplitude than those of said first pulse train, and means for comparing said first and second pulse trains in opposite phase thereby to produce a third pulse train comprising a series of positive and negative pulses, said comparing means being connected in series circuit arrangement with said second pulse train producing means and being interposed between the said producing means and a point on the coupling between said first pulse train producing means and said one electrode, and means for deriving said third pulse train from said input electrode system.

2. A circuit arrangement comprising a transistor having an emitter electrode, a base electrode forming with said emitter electrode an input electrode system and a collector electrode, means for applying a bias potential to said collector electrode, said bias potential being negative with respect to a point at ground potential, means for producing a first pulse train of a series of pulses of equal sign and a given repetition frequency, means coupling said first pulse train producing means between one electrode of said input electrode system and a point at ground potential, a positive feedback circuit coupling the other electrode of said input electrode system with said one electrode, said positive feedback circuit comprising means for producing a second pulse train of a series of pulses with a repetition frequency which is a sub-harmonic of said given repetition frequency, said second pulse train producing means comprising a parallel resonant circuit tuned to said sub-harmonic of said given repetition frequency and connected to said other electrode, said pulses of said second pulse train having a substantially greater amplitude than those of said first pulse train, and means for comparing said first and second pulse trains in opposite phase thereby to produce a third pulse train comprising a series of positive and negative pulses, said comparing means comprising a resistance-capacitance circuit connected in series circuit arrangement with said resonant circuit and being interposed between the said resonant circuit and a point on the coupling between said first pulse train producing means and said one electrode, and means for deriving said third pulse train from said input electrode system.

3. A circuit arrangement comprising a transistor having an emitter electrode, a base electrode forming with said emitter electrode an input electrode system and a collector electrode, means for applying a bias potential to said collector electrode, said bias potential being negative with respect to a point at ground potential, means for producing a first pulse train of a series of pulses of equal sign and a given repetition frequency, means coupling said first pulse train producing means between one electrode of said input electrode system and a point at ground potential, a positive feedback circuit coupling the other electrode of said input electrode system with said one electrode, said positive feedback circuit comprising means for producing a second pulse train of a series of pulses with a repetition frequency which is a sub-harmonic of said given repetition frequency, said second pulse train producing means comprising a parallel resonant circuit tuned to said sub-harmonic of said given repetition frequency and connected to said other electrode, said pulses of said second pulse train having a substantially greater amplitude than those of said first pulse train, and means for comparing said first and second pulse trains in opposite phase thereby to produce a third pulse train comprising a series of positive and negative pulses, said comparing means comprising a resistance-capacitance circuit connected in series circuit arrangement with said resonant circuit and being interposed between the said resonant circuit and a point on the coupling between said first pulse train producing means and said one electrode, square wave producing means comprising a transistor trigger circuit for converting said third pulse train to a square wave voltage, said trigger circuit comprising a transistor having an input electrode system and an output electrode system, means for supplying said third pulse train from said first-mentioned input electrode system to the input electrode system of said trigger circuit, and means for deriving said square wave voltage from said output electrode system.

4. A circuit arrangement comprising a transistor having an emitter electrode, a base electrode forming with said emitter electrode an input electrode system and a collector electrode, said transistor having an emitter-collector amplification factor larger than 1, means for producing a first pulse train of a series of pulses of equal sign and a given repetition frequency, means coupling said first pulse train producing means between one electrode of said input electrode system and a point at ground potential, a positive feedback circuit coupling the other electrode of said input electrode system with said one electrode, said positive feedback circuit comprising means for producing a second pulse train of a series of pulses with a repetition frequency which is a sub-harmonic of said given repetition frequency, said second pulse train producing means being connected to said other electrode, said pulses of said second pulse train having a substantially greater amplitude than those of said first pulse train, and means for comparing said first and second pulse trains in opposite phase thereby to produce a third pulse train comprising a series of positive and negative pulses, said comparing means being connected in series circuit arrangement with said second pulse train producing means and being interposed between the said producing means and a point on the coupling between said first pulse train producing means and said one electrode, and means for deriving said third pulse train from said input electrode system.

References Cited in the file of this patent

UNITED STATES PATENTS

| | | |
|---|---|---|
| 2,445,161 | Vogel | July 13, 1948 |
| 2,595,208 | Bangert | Apr. 29, 1952 |
| 2,599,964 | Woodbury | June 10, 1952 |
| 2,620,448 | Wallace, Jr. | Dec. 2, 1952 |
| 2,675,474 | Eberhard | Apr. 13, 1954 |